J. W. CORNELL.
Check-Rowing Attachment for Corn-Planter.
No. 223,887. Patented Jan. 27, 1880.

Front elevation Sliding Bar Seed Box & "Marker".

Elevation of "Sleeve" & "Clutch" Levers

Figure 1:
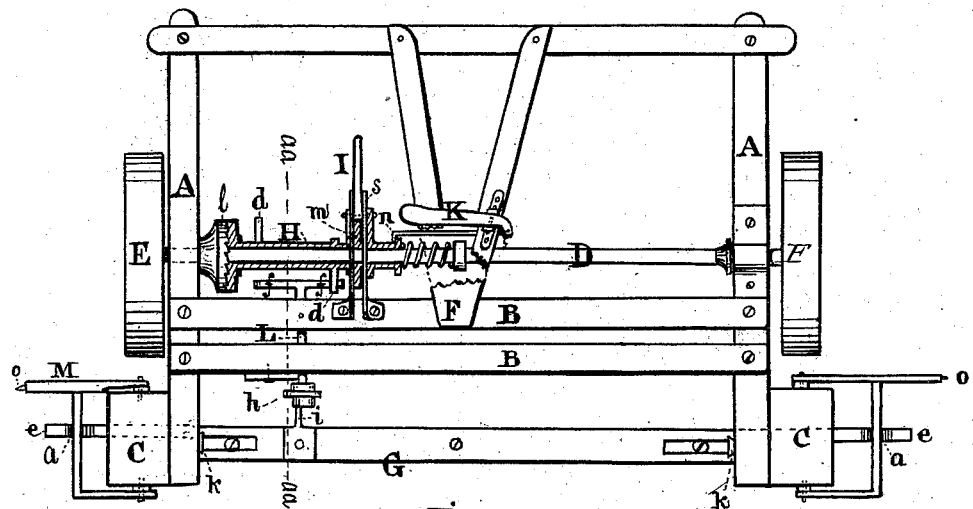

Vert. section & Side-elevation on line aa. Fig. 1.

Attest
John Sedley
Philip Barton

Inventor:
John W. Cornell
by E. Thurlow his
atty in fact

UNITED STATES PATENT OFFICE.

JOHN W. CORNELL, OF TOULON, ILLINOIS, ASSIGNOR OF ONE-HALF OF HIS RIGHT TO HENRY F. BLOOD AND CHARLES S. BLOOD.

CHECK-ROWING ATTACHMENT FOR CORN-PLANTERS.

SPECIFICATION forming part of Letters Patent No. 223,887, dated January 27, 1880.

Application filed August 14, 1879.

*To all whom it may concern:*

Be it known that I, JOHN W. CORNELL, of Toulon, in the county of Stark, in the State of Illinois, have invented an Improvement in Check-Rowing Attachments to Corn-Planters; and I do hereby declare that the following is a full, clear, and exact description thereof, reference being had to the annexed drawings, making a part of this specification, in which like letters of reference refer to like parts, and in which—

Figure 2:
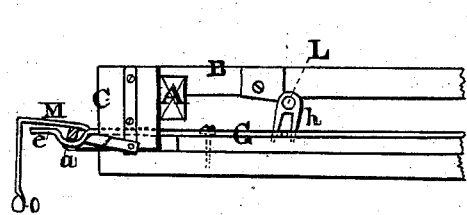
Figure 3:
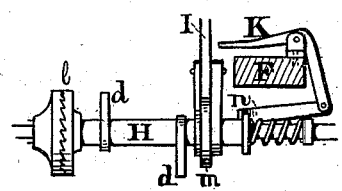
Figure 4:
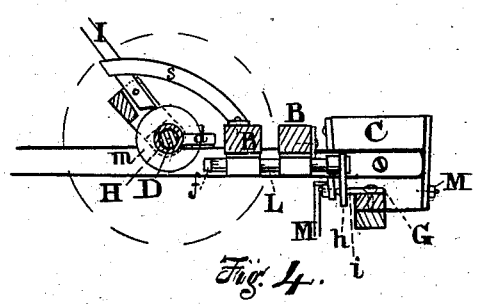

Figure 1 represents a plan view; Fig. 2, front elevation of half of machine; Fig. 3, cross elevation of axle, sleeve, and levers; Fig. 4, side elevation of the planter.

This invention consists in extending the usual sliding bar or seed-dropper beyond the respective seed-boxes far enough at each end to strike gravitating pivoted markers hinged, respectively, to said seed-boxes in such a manner as to let fall and raise each marker simultaneously with the fall of the seed.

The seed-bar and its extension may be oscillated by means of a crank or a dog projecting from a horizontal shaft reaching back to a point near the wheel-axle and terminating in horizontal cross-head or T, so placed that each end of the same be alternately depressed by means of dogs or arms projecting from a sleeve upon said wheel-axle, said sleeve being engageable, by means of a clutch, with the axle. In connection with this is an auxiliary cam and lever, by which the sleeve and arms or strikers can be made to anticipate the regular contact with the T-headed shaft when the planter and marker are slightly in advance of the proper line or row of corn through accident.

One of the forms of my invention is described as follows: A is an ordinary planter-frame; B B, its front bars; C C, seed-boxes pivoted to frame at *k k*; D, wheel-axle; E, wheels; F, tongue; G, sliding dropper-bar; H, sleeve on the wheel-axle, ending near the wheel on that side in the clutch *l*, and having the usual spiral spring, also two radial spokes or strikers, *d d*, or as many as may be desired, for alternately oscillating the adjoining T-headed shaft L, which works the seed-bar G. Said sleeve has also a disk or flange, *m*, on whose periphery impinges a pointed cam ending in a lever or handle, I, by which said sleeve and its spokes can be turned on the axle forward. K is another lever and rod, the latter clasping the end of the sleeve H, and the former pivoted upon the tongue F, working in such a manner as to disengage the sleeve with its clutch and throw it wholly out of engagement with seed-bar and marker L. The T-headed horizontal shaft, which works the sliding seed-bar G and its extended ends *e a e a*, is journaled upon or beneath the cross-pieces B B or frame, ending in the rear in the T-arms *f f*, and at the front in a radial fork, *h*, which engages with the lug or arm *i* of the sliding seed-bar G. The latter ends, beyond each seed-box C C, in an extension horizontally, each bent into a short curve or depression, *a a*, into which the respective pivoted markers M drop simultaneously at each oscillation of said bar and at the time of the fall of the seed. M are the markers, each a frame, mounted horizontally, and pivoted, respectively, to each seed-box, each frame ending in a line with the dropping-valves of the seed-boxes in an arm bent vertically to form a marker, *o*, or small spade-like point, by which a small quantity of soil is dug up and thrown away at each depression of the same when the frame M drops into the hollow *a* of the sliding bar G.

The operation of this check-rower is as follows: The sleeve H and its clutch *l*, operated at pleasure by means of the lever I, by a forward motion hastens the strike of the arms *d* of said sleeve upon the T-headed shaft which operates the sliding bar G and marker M when the machine is a little too far in advance of a corn-row, while the elbow-shaped lever K will withdraw the sleeve from the clutch *l* and delay the planting until the proper line is reached by the machine. The same motion, also, of said lever K also throws the whole of the planting and marking works out of gear when going to or from the field of operation or in turning the machine at the end of a row or line.

The hollow *a* in the sliding seed-bar G is so disposed as to let fall the marker M simultaneously with the fall or planting of the seed.

What I claim as my invention is—

1. The construction and arrangement of sliding seed-bar G, having extensions $a\,e$, in combination with markers M, and near its middle with the horizontal rock-shaft L, immediately operated, by means of the dogs $d$ of sleeve H, on the supporting-axle D, as described.

2. In a seed-planter, the sliding bar G, having horizontal extension $e$, with depression $a$, for the purpose of alternately letting fall and lifting a gravitating marker, M, or pivoted arm, which marks the land by falling into said depression $a$, substantially as and for the purposes described.

3. The combination, with sliding seed-bar G, of the extension $e\,a$, marker M, and seed-box C, substantially as and for the purposes described.

4. The construction and arrangement of the sliding seed-bar extension $e\,a$, marker M, and seed-box C, as described.

In testimony that I claim the foregoing corn-marker I have hereunto set my hand this 4th day of August, A. D. 1879.

JOHN W. CORNELL.

Witnesses:
WM. CHAMBERLAIN,
OLIVER WHITAKER.